(12) United States Patent
Zeng

(10) Patent No.: US 6,486,948 B1
(45) Date of Patent: Nov. 26, 2002

(54) APPARATUS AND METHODS RELATING TO HIGH SPEED RAMAN SPECTROSCOPY

(76) Inventor: Haishan Zeng, 1389 E. 37th Avenue, Vancouver, BC (CA), V5W 1G6

( * ) Notice: Subject to any disclaimer, the term of this patent is extended or adjusted under 35 U.S.C. 154(b) by 133 days.

(21) Appl. No.: 09/659,300

(22) Filed: Sep. 12, 2000

Related U.S. Application Data

(60) Provisional application No. 60/154,070, filed on Sep. 14, 1999.

(51) Int. Cl.[7] .............................. G01J 3/44; G01J 3/04; G01J 3/18
(52) U.S. Cl. ........................ 356/301; 356/328; 356/334
(58) Field of Search ................................ 356/301, 326, 356/328, 331, 332, 333, 334

(56) References Cited

U.S. PATENT DOCUMENTS

| | | | | |
|---|---|---|---|---|
| 2,750,836 A | * | 6/1956 | Fastie | 356/326 |
| 5,212,537 A | * | 5/1993 | Birang et al. | 356/300 |
| 5,521,703 A | * | 5/1996 | Mitchell | 356/301 |
| 5,615,673 A | * | 4/1997 | Berger et al. | 356/301 |
| 5,751,415 A | * | 5/1998 | Smith et al. | 356/301 |

\* cited by examiner

*Primary Examiner*—F. L. Evans
(74) *Attorney, Agent, or Firm*—Graybeal Jackson Haley LLP

(57) ABSTRACT

Systems and methods for rapid Raman spectroscopy. The speed is improved by providing light from a sample to a light-dispersive element, such as a holographic grating, in a pattern that inversely complements distortion caused by the grating. For example, if the grating imparts a curve to the spectral lines emanating from the grating, then the light is inserted into the grating in a curve in the opposite direction. Also calibration light guides able to transmit a known, or standard, light to the detection or spectroscopy system. The calibration light guide can be useful both with traditional light transmission guides and with the light transmission guides of the present invention.

35 Claims, 6 Drawing Sheets

APPARATUS AND METHODS RELATING TO HIGH SPEED RAMAN SPECTROSCOPY

CROSS-REFERENCE TO RELATED APPLICATIONS

The present application claims priority from U.S. provisional patent application No. 60/154,070, filed Sep. 14, 1999.

BACKGROUND OF THE INVENTION

When monochromatic light such as laser light strikes a sample, almost all of the light is scattered elastically, which is called Rayleigh scattering. This Rayleigh scattered light undergoes no change in energy or frequency. However, a very small portion of the light, ~1 in $10^8$, is scattered in elastically, which is called Raman scattering. This light does undergo a change in energy and frequency, and the change corresponds to an excitation of the illuminated molecular system, most often excitation of vibrational modes. Measuring the intensity of the Raman scattered photons as a function of the frequency difference provides a Raman spectrum. Raman peaks are typically narrow (a few wavenumbers) and in many cases can be associated with the vibration of a specific chemical bond (or normal mode dominated by the vibration of a single functional group) in a molecule. As such, it is a "fingerprint" for the presence of various molecular species and can be used for both qualitative identification and quantitative determination. Analytical Raman Spectroscopy, Chemical Analysis Series Vol. 114, J. G. Grasselli and B. J. Bulkin, Eds. (John Wiley, New York, 1991).

Raman spectroscopy has a variety of potential uses in vivo. For example, Raman spectra have been observed from various biological tissues including skin. Ozaki, Y.: "Medical application of Raman spectroscopy" *Appl. Spectr. Rev.* 24:259–312, 1988; Manoharan, R., et al. "Histochemical analysis of biological tissues using Raman spectroscopy," *Spectro. Acta Part A*, 52:215–249, 1996; Mahadevan-Jansen, A. and Richards-Kortum, R.: "Raman spectroscopy for the detection of cancers and precancers," *J. of Biomed. Op.*, 1:31–70, 1996. Identified Raman scatterers in tissues include elastin, collagen, blood, lipid, tryptophan, tyrosine, carotenoid, myoglobin. Id. Most of the data has been obtained from ex vivo tissue samples using Fourier-Transform (FT) Raman spectrometers. These data have demonstrated that Raman spectroscopy has potential for diagnosis of diseases. Raman spectroscopy might also be used to monitor cutaneous drug delivery and pharmacokinetics during skin disease treatment. Schallreuter, K. U.: "Successful treatment of oxidative stress in vitiligo," *Skin Pharmacol. Appl. Skin Physiol.* 12(3):132–8, 1999; Lawson, E. E., et al. "Interaction of salicylic acid with verrucae assessed by FT-Raman spectroscopy," *J. Drug Target* 5(5) :343–51, 1998; Schallreuter, K. U., et al. "In vivo evidence for compromised phenylalanine metabolism in vitiligo," *Biochem. Biophys. Res. Commun.* 13;243(2):395–9, 1998; Schallreuter, K. U., et al. "Oxybenzone oxidation following solar irradiation of skin: photoprotection versus antioxidant inactivation," *J. Invest. Dermatol.* 106(3):583–6, 1996. Raman spectroscopy could also potentially be used to detect the presence of prohibited drugs used by athletes or specific drugs in drug abusers.

In order to enhance such uses, Raman measurements should be able to be performed in vivo and quickly, preferably within seconds or sub-seconds. FT-Raman systems typically require as much as half an hour to acquire a spectrum and are typically bulky and not portable. Manoharan, R., et al. "Histochemical analysis of biological tissues using Raman spectroscopy," *Spectro. Acta Part A,* 52:215–249, 1996. Recently developed dispersive-type Raman systems based on fiber optic light delivery and collection, compact diode lasers, and high efficiency spectrograph-detector combinations, may be able to acquire in vivo tissue Raman spectrum in seconds. Baraga, J. J., et al. "Rapid Near-infrared Raman spectroscopy of human tissue with a spectrograph and CCD detector," *Appl. Spectro.* 46:187–90, 1992; Kramer, J. R., et al. "Spectral diagnosis of human coronary artery: a clinical system for real time analysis," *SPIE Proc.* 2395:376–82, 1995; Mahadevan-Jansen, A., et al. "Development of a fiber optic probe to measure NIR Raman spectra of cervical tissue in vivo," *Photochem. Photobiol.* 68(3):427–31, 1998.

Thus, there is a need for Raman spectroscopy systems capable of fast speeds or high quality results. The present invention provides these and other advantages.

SUMMARY OF THE INVENTION

The present invention provides systems and methods for rapid Raman spectroscopy. The speed is improved by providing light from a sample to a light-dispersive element, such as a holographic grating, in a pattern that inversely complements distortion caused by the grating or other device. For example, if the grating imparts a curve to the spectral lines emanating from the grating, then the light is inserted into the grating in a curve in the opposite direction. These and other features of the present invention enhance the signal to noise ratio and improve the spectral resolution of the system. The present invention also provides a calibration light guide able to transmit a known, or standard, light to the detection or spectroscopy system. The calibration light guide can be useful both with traditional light transmission guides and with the light transmission guides of the present invention.

In one aspect, the present invention provides a light transmission bundle suitable for use for Raman spectroscopy, the light transmission bundle comprising a proximal end and a distal end and comprising at least 5 light guides, wherein the light guides are arranged in a substantially filled-in geometrical shape at the proximal end of the light transmission bundle and a substantially linear curve at the distal end. In some embodiments, the substantially linear curve is a parabolic curve, and can be substantially identical to a curve of a substantially linear line of light after it has been passed through a holographic grating, for example a volume phase technology (VPT) holographic grating. In some embodiments, the filled-in geometrical shape is a circle, although other shapes are also possible. (Unless expressly stated otherwise or clear from the context, all embodiments of the present invention can be mixed and matched.)

The present invention also provides a calibration light guide, which can be one of the light guides at the distal end of the light transmission bundle described above, for example at the center of the substantially linear curve. Typically, the proximal end of the calibration light guide is optically connected to a calibration light source.

In another aspect, the present invention provides a Raman spectrometer system comprising a detection light guide able to detect light emanating from a sample. A distal end of the detection light guide is optically connected to a plane grating that is in turn optically connected to a pixelated light detector operably connected to a controller containing computer-implemented programming that detects light impinging on detection pixels in the pixelated light detector. A light transmissive portion of the distal end of the detection light guide is arranged in a substantially inverse shape that is complementary to a distortion to the light caused by passing the light through the plane grating, to provide light in a substantially straight line at the pixelated light detector. In some embodiments, the light guide is similar to that described above.

The Raman spectrometer system can further comprise a monochromatic illumination light source that provides illumination light to the sample, and an illumination light guide and a probe located at the distal end of the illumination light guide, wherein the illumination light guide transmits the monochromatic illumination light from the light source to the probe, which in turn transmits the illumination light to the sample. The monochromatic illumination light source can be an infrared laser, for example having a power of at least about 250 mW, a wavelength of about 785 nm, and a power of about 300 mW. The illumination light guide can be a single optical fiber having a diameter less than about 200 $\mu$m. Preferably, the proximal end of the detection light guide is optically connected to the probe.

The probe can further comprise a compound parabolic concentrator (CPC) optically connected at the proximal end of the detection light guide, wherein the compound parabolic concentrator collects light emanating from the sample and concentrates it and transmits it into the distal end of detection light guide. Alternatively, the proximal end of the detection light bundle can have a large a diameter, for example greater than about 1 mm, and then the detection probe may not comprise a CPC. In some embodiments, the probe is sized to provide an illumination spot on the sample that is substantially larger than a detection spot detected by the probe.

The Raman spectrometer system can further comprise a calibration light guide optically connected to a calibration light source. Also, the detector preferably comprises an array of detection pixels and the detection light guide preferably comprises a bundle comprising enough light guides to substantially fill a column or row of the array, wherein the bundle comprises more than about 50 light guides. The light guides can be selected from the group consisting of an optical fiber, a liquid light guide and a hollow reflective light guide. Also, the system is preferably portable.

The present invention further provides means for and steps of achieving the various aspects, embodiments and features of such invention.

In a further aspect, the present invention provides methods of making a light transmission bundle comprising a) providing at least 5 light guides, b) arranging the light guides in a filled-in geometrical shape at a proximal end of the light transmission bundle, and c) arranging the light guides in a substantially linear curve at the distal end of the light transmission bundle. In some embodiments, the methods further comprise adding a calibration light guide to the light transmission bundle.

In another aspect, the present invention provides methods of taking a Raman measurement comprising a) illuminating a sample under conditions and for a time sufficient to induce measurable Raman scattered light to emanate from the sample, b) collecting the emanating light, c) providing the emanating light with a substantially inverse shape that is complementary to a distortion to the light caused by passing the light through a light-dispersive element, d) passing the light having the substantially inverse shape through the plane grating to provide substantially straight spectral lines, and e) performing Raman spectroscopic analysis on the substantially straight spectral lines. In some embodiments, providing the substantially inverse shape further comprises transmitting the emanating light through a detection light guide wherein the light transmissive portion of the distal end of the detection light guide is arranged in a substantially inverse shape that is complementary to a distortion to the light caused by passing the light through the light transmissive element, and wherein the light transmissive element comprises a plane grating. Illuminating the sample and collecting the emanating light can be done through a probe optically connected to an illumination light source and to the detection light guide, for example by providing an illumination spot on the sample that is substantially larger than the detection spot detected by the probe. The methods can further comprise providing calibration light, and can be performed using a portable Raman system, and in less than about 1 second.

These and other aspects of the present invention will become evident upon reference to the following Detailed Description and attached drawings. In addition, various references are set forth herein that describe in more detail certain apparatus and methods; all such references are incorporated herein by reference in their entirety.

DETAILED DESCRIPTION OF THE INVENTION

The present invention provides high speed Raman systems for spectroscopy, such as in vivo spectroscopy, and other spectral analyses. The performance of the Raman systems is improved by providing a light collection or detection device that displays light emanating from a sample into a holographic grating, or other device that separates the light into its spectral components, in a pattern that inversely complements any distortion caused by the grating or other device. For example, if the grating imparts a curve to the spectral lines emanating from the grating, then the light collection device corrects the distortion by inserting the light into the grating in a curve in the opposite direction. These and other features of the present invention enhance the signal to noise ratio and improve the spectral resolution of the system. The present invention also provides a calibration light guide able to transmit a known, or standard, light to the detection or spectroscopy system. The calibration light guide can be useful both with traditional light transmission guides and with the light transmission guides of the present invention.

Figure 1:
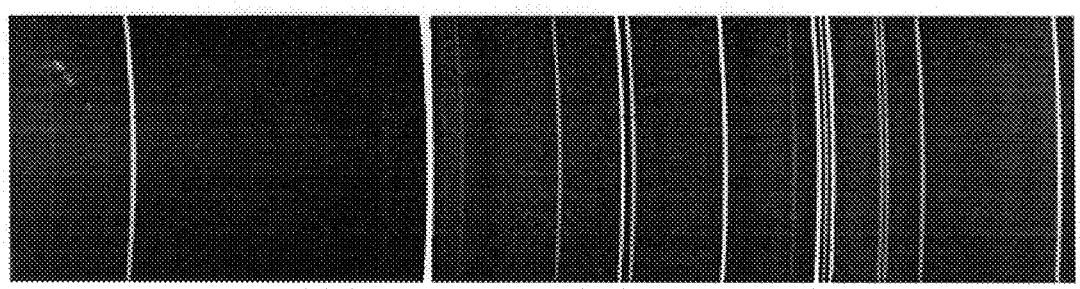
FIG. 1 provides an image of light from a 100-$\mu$m slit passed through a holographic plane grating, demonstrating image aberration.
Figure 2:
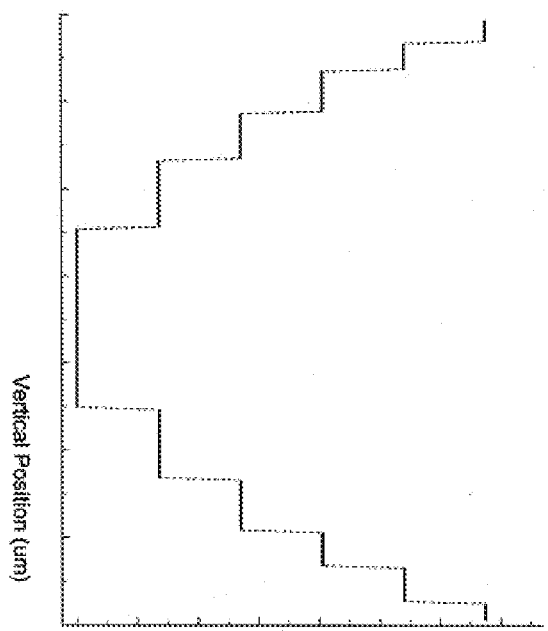
FIG. 2 depicts a graph of the horizontal displacement of a spectral line as in FIG. 1, with the displacement rounded to 27-$\mu$m pixels.

One of the difficulties with previous high speed Raman systems that use a plane grating, and other Raman or other optical systems that transmit light through a plane grating, is that the light is distorted by the plane grating. For example, a straight line of light (such as light passed through a slit) typically comes out of the grating as substantially linear curve, typically a parabolic curve. James, J. F., and Sternburg, R. S.: "The design of optical spectrometers," Chapman and Hall Ltd., London, England, 1969. This phenomenon can be due to the fact that the light rays from different positions along the length of the slit are incident on the grating with varying amounts of obliqueness. For spectrographs having a short focal length, such as a holographic spectrograph such as the Kaiser HoloSpec spectrograph (Kaiser Optical Systems. Inc., Ann Arbor, Mich.), the obliqueness causes a significant distortion that can affect the performance of a detector downstream in the light path. As an example of this, FIG. 1 shows the spectral lines resulting from passing light from a mercury-argon calibration lamp through a 100 $\mu$m slit and then through a Kaiser HoloSpec spectrograph. The curvature of the spectral lines is apparent in FIG. 1. FIG. 2 shows in graphical form the horizontal displacement of a spectral line from FIG. 1 in graphic form, with the displacement rounded to 27-$\mu$m pixels. The maximum horizontal displacement in FIG. 2 is 5 pixels.

One of the well-known approaches for improving the performance of a spectrometer is to combine the signal from an entire spectral line for analysis. This can be called "hardware binning," and in a charge-coupled device (CCD) the binning can be performed before the signal is read out by the preamplifier. For signal levels that are limited by readout noise, such as weak Raman signal measurement, hardware binning improves signal to noise ratio (S/N) linearly with the number of pixels grouped together. The image aberration described in the previous paragraph detracts from the effectiveness of hardware binning because the entire spectral line no longer hits a single line (row or column) of pixels in the detector. This can decrease the spectral resolution and the S/N. It can also cause problems with wavelength calibration. Binning can also be done by software after the signal is read out. However, such software binning typically improves the S/N only by as much as the square root of the number of pixels added together. Hence, hardware binning is preferred for maximum S/N. Other approaches bin the 11 segments shown in FIG. 2 using hardware binning and then shifting the appropriate number of pixels before summing them together using software binning. Kaiser Optical Systems, Inc. "HoloSpec VPT System Operations Manual," 1994. This may be termed a "combined hardware and software binning procedure." The previous approach of acquiring the whole image first and then adding all the pixels along the curved line together by software binning can be termed a "complete software binning procedure."

Figure 5:
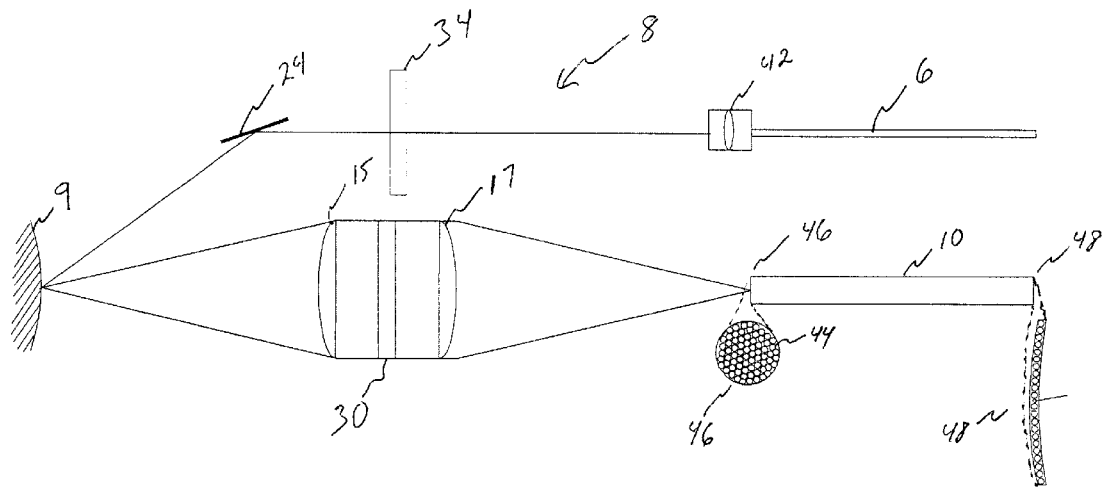
FIG. 5 provides a schematic block diagram of a probe for Raman measurement in vivo or for other distant samples, the Figure also depicting the proximal and distal ends of a detection light guide according to the present invention.
Figure 6:
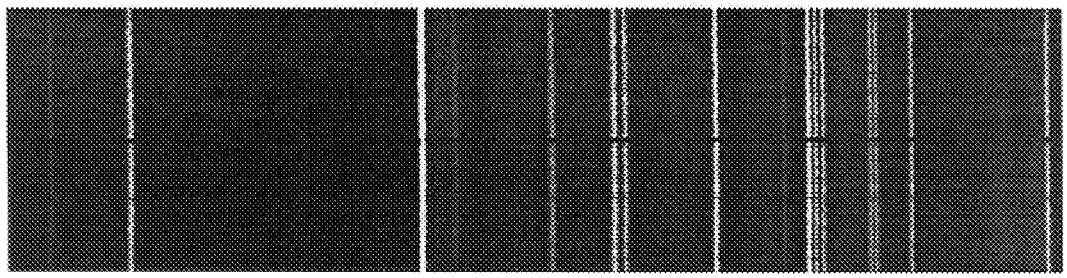
FIG. 6 provides an image of spectral lines from light that has been supplied to the. HoloSpec spectrograph in a curve comprising 58 optical fibers that is inversely complementary to aberration depicted in FIG. 1. The dark spots in the middle of the spectral lines are from the calibration fiber, which was not illuminated in the image.

One of the features of the present invention corrects the image aberration and allows hardware binning of a whole spectral line. As shown in FIG. 5 and described more fully below, the output from the detection light guide is provided to the grating in a shape that is substantially inversely proportional to the aberration caused by the grating. For example, where the grating imparts a parabolic curve to the light, the output of the detection light guide forms an inverse or complementary curve, as shown in FIG. 5, so the light emanating from the grating onto the detector is a straight line, as shown in FIG. 6. This allows full hardware binning of the entire vertical line without losing resolution and without reducing S/N. Compared to the combined hardware and software binning procedure, the S/N improvement can be up to at least about $11^{1/2}$ or 3.3 times or more, and compared to the complete software binning procedure, the S/N improvement can be up to at least about $256^{1/2}$ or 16 times or more.

Definitions

The following paragraphs provide definitions of some of the terms used herein. All terms used herein, including those specifically described below in this section, are used in accordance with their ordinary meanings unless the context or definition indicates otherwise. Also unless indicated otherwise, except within the claims the use of "or" includes "and" and vice-versa. Non-limiting terms are not to be construed as limiting unless expressly stated (for example, "including" means "including without limitation" unless expressly stated otherwise).

An "illumination light path" is a light path from a light source to a sample, while a "detection light path" is a light path for light emanating a sample to a detector. Light emanating from a sample includes light that reflects from a sample, is transmitted through a sample, or is created within the sample, for example, fluorescent light that is created within a sample pursuant to excitation with an appropriate wavelength of light (typically UV or blue light). In the present application, such emanating comprises light that has been Raman scattered.

A "controller" is a device that is capable of controlling a detector or other elements of the apparatus and methods of the present invention. For example, the controller may control the pixels of a pixelated light detector or compile or interpret data obtained from the detector. Typically, a controller is a computer or other device comprising a central processing unit (CPU). Controllers are well known in the art and selection of a desirable controller for a particular aspect of the present invention is within the scope of the art in view of the present disclosure.

"Upstream" and "downstream" are used in their traditional sense wherein upstream indicates closer to a light source, while downstream indicates farther away from a light source. Similarly, "proximal" indicates upstream and "distal" indicates downstream.

The terms set forth in this application are not to be interpreted in the claims as indicating a "means plus function" relationship unless the word "means" is specifically recited in the claims. This is also true of the term "step" for process or method claims.

Other terms and phrases in this application are defined in accordance with the above definitions, and in other portions of this application.

The Figures

Figure 3:
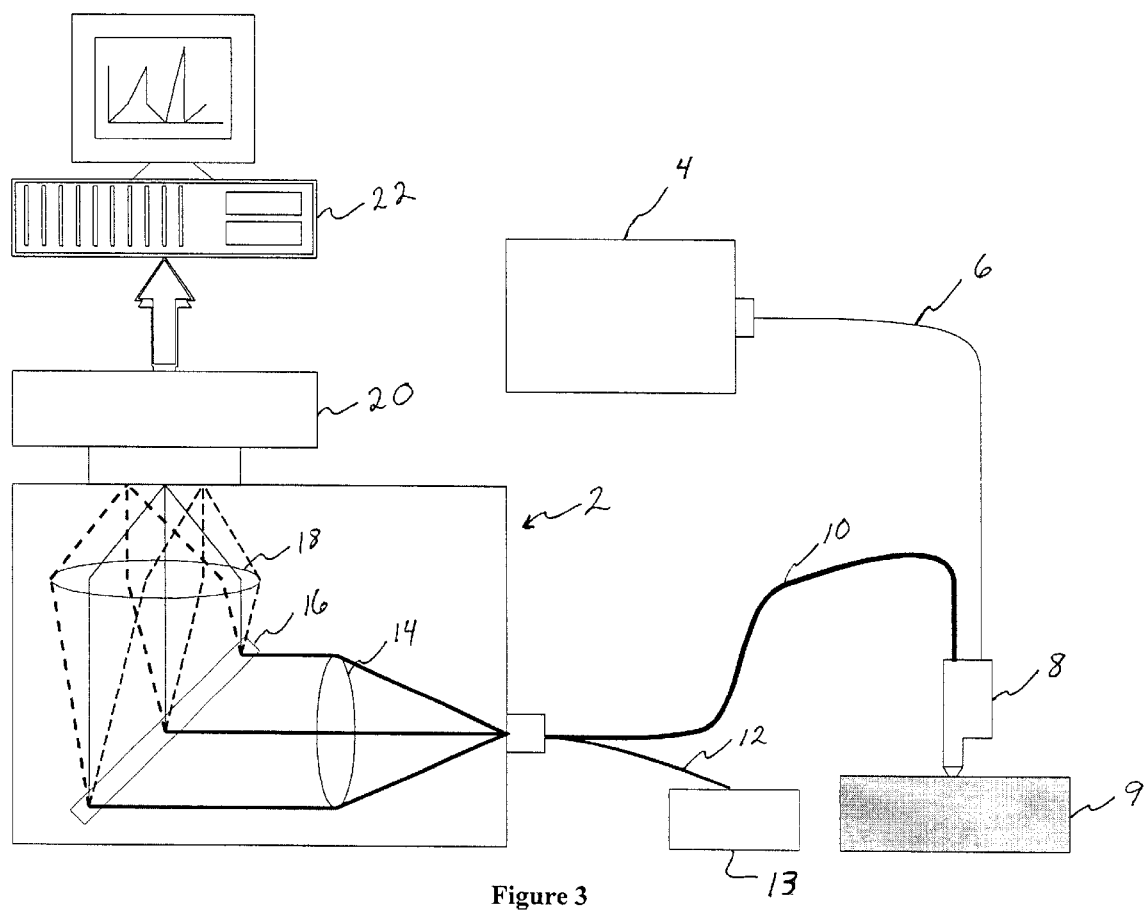
FIG. 3 provides a schematic block diagram of a rapid Raman spectrometer system.

Turning to the figures, as noted above FIGS. 1 and 2 depict curved spectral lines from a plane grating. FIG. 3 depicts a schematic block diagram of a rapid Raman spectrometer system according to one embodiment of the invention. In the figure, a light source 4, preferably a monochromatic light source such as laser, for example an infrared laser such as an external cavity stabilized diode laser (785 nm, 300 mW, SDL Inc.), provides light capable of inducing Raman scattering in a sample, such as tissue. Preferably, the light source minimizes interference from non-desired sources. For example, if the sample is a tissue, then the light source can be selected to minimize fluorescence from the sample and the absorption of photons emanating from melanin. The light source 4 is optically coupled to the proximal end of an illumination light transmission guide 6. In FIG. 3, the illumination light transmission guide 6 is a 100-$\mu$m optic fiber. The illumination light transmission guide 6, and other light guides of the present invention, can also be a liquid light guide or hollow reflective light guide or lens system, or a bundle of any of such light guides or other light guides able to transmit the illumination or detection light, or other light, as desired.

The illumination light transmission guide 6 is optically connected at its distal end to a probe 8, for example via a SMA connector. The probe 8 transmits then illumination light to the sample 9, and then gathers the return light emanating from the sample, which return light comprises Raman photons. The light collected by probe 8 is transmitted to a spectrograph 2, such as a holographic transmissive spectrograph (Kaiser, HoloSpec-f/2.2-NIR), through a detection light guide 10. As noted above, the detection light guide that transmits the detection light can be an optical fiber, a liquid light guide or hollow reflective light guide or lens system, or a bundle of any of such light guides or other light guides able to transmit the light. In a preferred embodiment, the detection light guide comprises a bundle of light guides because it is relatively simple to control the geometry of the light guides in the bundle so that the bundle can have one shape at the proximal end of the detection light guide (i.e., the portion of the detection light guide 10 at the probe) and a second shape at the distal end of the light guide (i.e., the portion of the detection light guide 10 at the spectrograph). A calibration light guide 12 provides light from a calibration light source to the spectrograph 2.

The light from the detection light guide 10 is fed through a lens 14 and into a plane grating 16. In preferred embodiments the plane grating is a holographic grating, such as a volume phase technology (VPT) holographic grating (Kaiser, HSG-785-LF). The plane grating 16 disperses the incoming light through a second lens 18 onto the detector 20. The detector can be pixelated, such as a charge coupled device (CCD), such as an LN/CCD-1024EHRB from Princeton Instruments, charge injection device (CID), intensified CCD detector, photomultiplier tube (PMT) detector array, photo-diode array (PDA), intensified PDA and an avalanche photo-diode (APD) array. In a preferred embodiment, the detector is a back-illuminated, deep depletion CCD detector with enhanced QE and reduced etaloning in the NIR (QE$\geq$70% at 900 nm), is liquid nitrogen cooled, and its S/N is read-out noise limited when acquiring weak Raman signals. The detector in one example has 1024$\times$256 pixels (27-$\mu$m$\times$27-$\mu$m) in a 27.6-mm$\times$6.9-mm size rectangular array and allows vertical binning (Princeton Instruments, LN/CCD-1024EHRB). The detector 20 is operably connected to and controlled by a controller 22, which can be a PC computer. The Raman spectra are preferably displayed on the computer screen in real time and can also be saved for future display or further analysis.

In one embodiment, the plane grating 16 covers. the low frequency "fingerprint" Raman bands from 0 up to 2080 cm$^{-1}$. In another embodiment, the spectrograph 2 has an f-number, such as 2.2, that matches the numerical aperture (NA) of the fiber bundle (e.g., NA=0.22). Coupling optics in the spectrograph preferably provide 1:1 imaging with minimal optical losses due to NA matching between the spectrograph and the fibers. This spectrograph has 5 times better throughput and better spectral resolution compared to a traditional f/4, ¼-meter imaging. Czerny-Turner spectrograph used in conventional dispersive Raman systems (see, e.g., Owen, H., et al., "*New spectroscopic instrument based on volume holographic optical elements.*" SPIE Proceed, 2406, 1995).

The whole spectrometer system of this and other embodiments of the present invention can be permanent or can be portable, for example it can be movable on a cart for outpatient clinical data acquisition.

Figure 4:
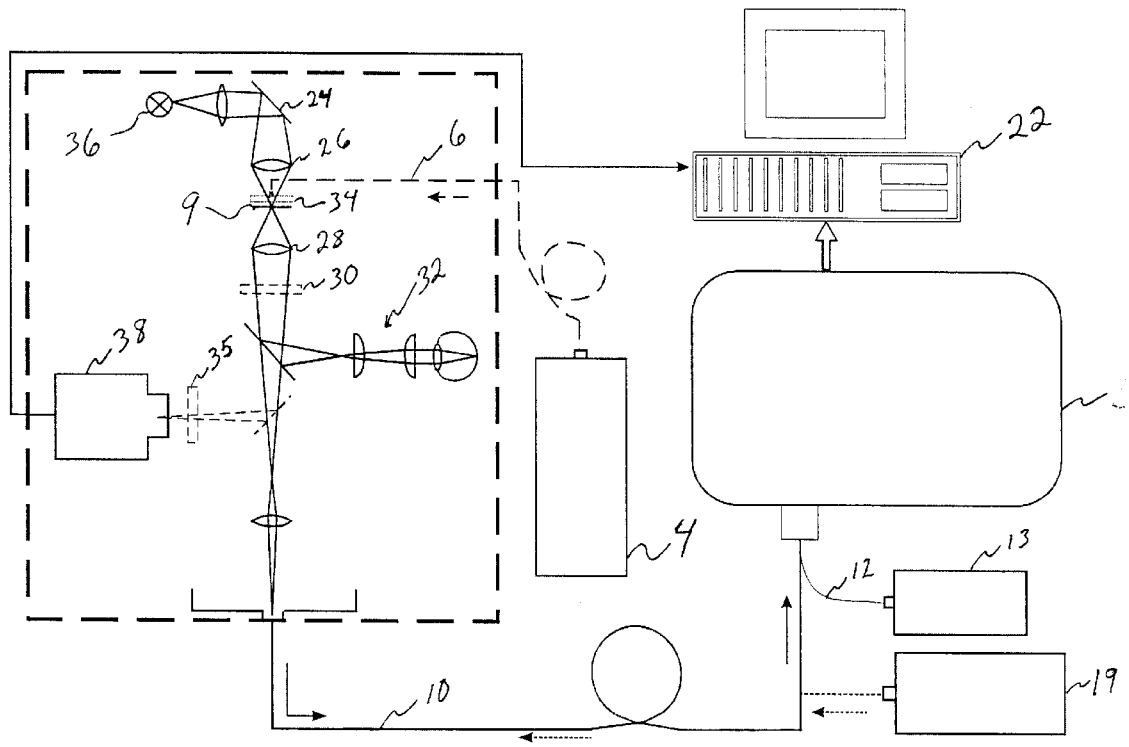
FIG. 4 provides a schematic block diagram of a rapid Raman microspectrophotometer system.

FIG. 4 depicts an example of a rapid Raman microspectrophotometer system according to the present invention. The system provides both imaging and spectral analysis. The system comprises up to four light sources, monochromatic (here, a laser) light source 4, calibration light source 13, alignment light source 19 and halogen lamp 36. Calibration light source 13 provides alignment light that is transmitted into the system. Alignment light source 19 provides light that travels up to the microscope to identify the specific spot being examined in the sample. Light from the monochromatic light source 4 or halogen lamp 36 is transmitted to a sample 9, via one or more mirrors 24, condenser lenses 26 or illumination light guides 6. Light emanating from the sample is transmitted to eyepiece 32, imaging device 38 such as a CCD camera, or Raman spectrometer 40. One or more of the devices, in the figure the Raman spectrograph 2 and imaging device 38, can be operably connected to a controller 22. The system can include a band pass filter 34 between the illumination light source and the sample to eliminate Raman spectra and fluorescence from the illumination light path, a notch filter 30 between the sample and the spectrograph 2 to filter out illumination light from monochromatic light source 4, and an optional narrow band pass filter 35 in front of the imaging device to select Raman bands of interest for imaging. Other filters, mirrors, lenses and other optical components can be selected by a person of ordinary skill in the art in view of the present specification.

FIG. 5 depicts a probe for taking Raman measurements, and the proximal and distal ends of a detection light guide according to the present invention. In the probe 8, a collimator lens 42 collimates the illumination light coming out of illumination light guide 6, and a band pass filter 34 filters out the Raman signals and the autofluorescence signals that are generated by passing the illumination light through the illumination light guide 6. Mirror 24 deflects the illumination light beam to the sample 9. In an alternative embodiment, the illumination light passes through a holographic band pass filter (Kaiser Optical Systems, Inc.) that turns the illumination light beam 90°. The beam is then deflected to the sample by a mirror. A pair of lenses 15, 17, for example, two one-inch diameter f/2 quartz lenses, collects the scattered light from the sample surface. The collimator lens 15 is preferably positioned so that its focal point is located at the sample surface, providing a collimated beam between the two lenses. A notch filter 30, such as a holographic notch plus filter (Kaiser), can be placed between the collimator lens 15, and the focusing lens 17, to block the Rayleigh scattered light and pass the frequency-shifted Raman signal. Focusing lens 17 focuses the filtered beam onto the proximal end of detection light guide 10. Detection light guide 10 then transmits the light to the Raman spectrometer.

In one embodiment, detection light guide 10 comprises 100 $\mu$m optical fibers 44 packed into a first shape, such as a filled-in geometric shape such as a circle (as in the Figure), a square, a rectangle or a hexagon, at the proximal, or input, end 46. The shape can be other than filled-in if desired. The fibers are arranged in a second shape, such as curved line, at the distal, or output, end 48. In particular, the optical fibers 44 or other light transmissive portion of the detection light guide 10 are arranged such that they provide a substantially inverse shape to the distortion to the light caused by passing the light through the plane grating, which means that the shape is complementary to such distortion so that the light emanating from the plane grating 16 is in a straight line (or other shape if so desired). For example, in one embodiment the shape at the distal end 48 of detection light guide 10 is a parabolic curve that has substantially the same horizontal displacement as shown in FIGS. 1 and 2 but in the reverse direction. A calibration fiber 50 can be added to the distal end 48 of detection light guide 10. Again referring to the curve in FIGS. 1 and 2 for exemplary purposes, a parabolic line or curve can be fitted to the graph in FIG. 2 by linear regression line fitting or can be approximated by five segments of straight lines.

FIG. 6 shows a CCD image of light from a mercury-argon calibration lamp. The light was carried by a detection light guide 10 comprising a bundle of about 58 100 $\mu$m light guides arranged in an inverse curve as discussed above and then passed through a plane grating to give spectral lines. The spectral lines of the light are substantially straight. The dark spots in the center of the spectral lines are from a 50-$\mu$m calibration light guide disposed at the center of the bundle that was not illuminated. Accordingly, the light can be hardware binned without losing resolution and without reducing S/N.

Preferably, the detection light guide 10 is a bundle and comprises as many fibers as will fit the vertical or horizontal (or other straight-line characteristic) size of the detector. For example, for the image in FIG. 6, the CCD had a height of about 6.9 mm, and about 58×100-$\mu$m optic fibers and 1×50 $\mu$m optic fiber were fitted into the detection light guide 10.

At the proximal end of the detection light guide 10 the fibers were packed into a 1.6 mm diameter area. Therefore the measurement or detection spot size on the sample surface was also 1.6 mm. If desired, a compound parabolic concentrator (CPC) can be used to collect more light from the sample. However, the proximal end diameter of the fiber bundle, which is restricted by the vertical size of the CCD array and the desired spectral resolution, may not be as big as the output aperture of the CPC to fully make use of the light collection capability of the CPC. Also the laser beam may need to be focused smaller than the input aperture diameter of the CPC, therefore, restricting the total illumination power to prevent tissue damage. Accordingly, in another embodiment it is preferred not to use a CPC, but collect light directly from a large spot on the sample. Preferably, the illumination spot is larger than the detection spot to increase the total allowable illumination power. The Raman signal generated by the large beam may diffuse into the measurement spot and be collected.

In other aspects, the present invention provides methods of making and using the devices and systems described herein. For example, the present invention provides methods of making a light transmission guide or bundle as described herein, which methods can include providing at least 5 light guides, arranging the light guides in a substantially filled-in geometrical shape at a proximal end of the light transmission bundle, and arranging the light guides in a substantially linear curve at the distal end of the light transmission bundle. The order of the steps in these methods is not critical. In some embodiments, the methods can further include arranging the light transmissive portion or element of the light guide in a substantially parabolic curve at the distal end of the light transmission guide, the parabolic curve being substantially identical to a curve of a substantially linear line of light after it has been passed through a holographic grating if desired. Similarly, the filled-in geometrical shape can be a circle or other desired shape. In other embodiments, the methods comprise providing a calibration light guide to the light transmission bundle. The calibration light guide can be useful both with traditional light transmission guides and with the light transmission guides of the present invention.

In further aspects, the present invention provides methods of taking a Raman measurement comprising illuminating a sample under conditions and for a time sufficient to induce measurable Raman scattered light to emanate from the sample, collecting the emanating light, transmitting the emanating light through a detection light guide as described herein, passing the light through the plane grating to provide substantially straight spectral lines, and performing Raman spectroscopic analysis, such as display, measurement, comparison or other desired functions on the substantially straight spectral lines. In other aspects, the methods comprise providing the light in a particular shape that is complementary to the shape imparted by the light-dispersive element (such as the plane grating) via the use of curved mirrors or other optical elements able to control the shape of the light. The present invention also includes systems comprising such alternative approaches to providing complementary-shaped light.

In some embodiments, the methods further comprise illuminating a distant sample, such as an in vivo sample or a sample in a difficult to reach location in a machine, and collecting the emanating light from the sample through a probe such as those as described herein. The methods can also be performed using a portable Raman system. For example, the system can be carried on a cart or in a carry-bag so that it can move from one person or machine to another. The Raman measurements can be obtained in relatively short times, typically less than about 5 seconds, generally less than about 2 seconds, preferably less than about 1 second, and further preferably less than about 0.5 seconds

EXAMPLES

A Raman spectroscopy system was built with a detection light guide comprising a bundle of 58×100 $\mu$m and 1×50 $\mu$m optic fiber light guides arranged in an inverse curve that can be described by the coordinates $x=0.000011904y^2+0.000194553y-4.4485278$. At the proximal end of the detection light guide the fibers were packed into a 1.6 mm diameter area. Therefore the measurement or detection spot size on the sample surface was also 1.6 mm. The system also had a volume phase technology (VPT) holographic grating (Kaiser, HSG-785-LF) and an LN/CCD-1024EHRB charge coupled device (CCD) (Princeton Instruments). The spectral lines of the light emanating from the sample were thus substantially straight at the CCD and hardware binning of the spectral lines was performed.

Figure 7:
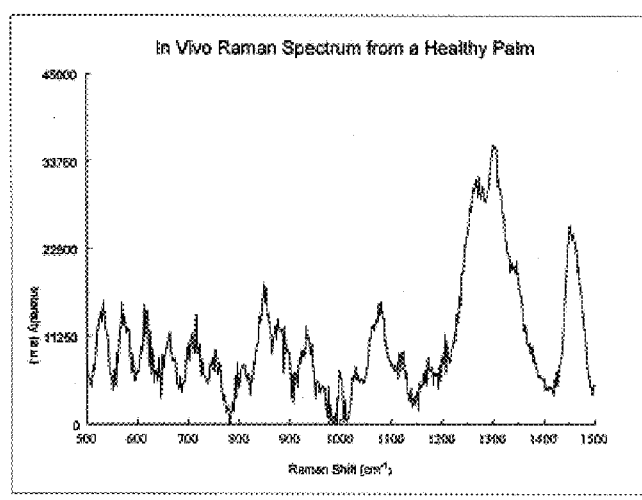
FIG. 7 provides an iii vivo Raman spectrum from the palm of a healthy volunteer obtained with an integration time of 5 seconds using the Raman system of the present invention.

FIG. 7 shows an in ivivo Raman spectrum from the palm of a healthy volunteer obtained with an integration time of 5 seconds using the system. The major Raman peaks shown in the graph are consistent with spectra published in literature. Caspers, P. J., et al., "In vitro and in vivo Raman spectroscopy of human skin," *Biospectro.*, 4:S31–S39, 1998; Gniadecka, M., et al., "Distinctive molecular abnormalities in benign and malignant skin lesions: Studies by Raman spectroscopy," *Photochem. Photobiol.*, 66:418–423, 1997; Gniadecka, M., et al., "Diagnosis of basal cell carcinoma by Raman spectroscopy," *J. Raman Spectrosc.*, 28:125–130, 1997; Williams, A. C., et al., "Fourier transform Raman spectroscopy: A novel application for examining human stratum corneum," *Int. J. Pharm.*, 81, R11–14, 1992; Barry, B. W., et al., "Fourier transform Raman and infrared vibrational study of human skin: Assignment of spectral bands," *J. of Raman Spectro.*, 23:641–5, 1992; Edwards, H. G. M., et al., "Novel spectroscopic deconvolution procedure for complex biological systems: Vibrational components in the FT-Raman spectra of ice-man and contemporary skin," *J. Chem. Soc. Faraday Trans.*, 91:3883–7, 1995; Williams, A. C., et al., "A critical comparison of some Raman spectroscopic techniques for studies of human stratum corneum," *Pharma Res.*, 10:1642–1647, 1993; Williams, A. C., et al., "Comparison of Fourier transform Raman spectra of mammalian and reptilian skin," *Anal.*, 119:563–566, 1994; Williams, A. C., et al., "Raman spectra of human keratotic biopolymers: Skin, callus, hair and nail," *J. Raman Spectrosc.*, 25: 95–98, 1994; Barry, B. W., et al., "Fourier transform Raman and IR spectra of snake skin," *Spectrochim. Acta, Part A,* 49:801–807, 1993; Edwards H. G. M., et al., "Raman spectroscopic studies of the skin of the Sahara sand viper, the carpet python and the American black rat snake," *Spectrochim. Acta. Part A,* 49:913–919, 1993.

Figure 8:
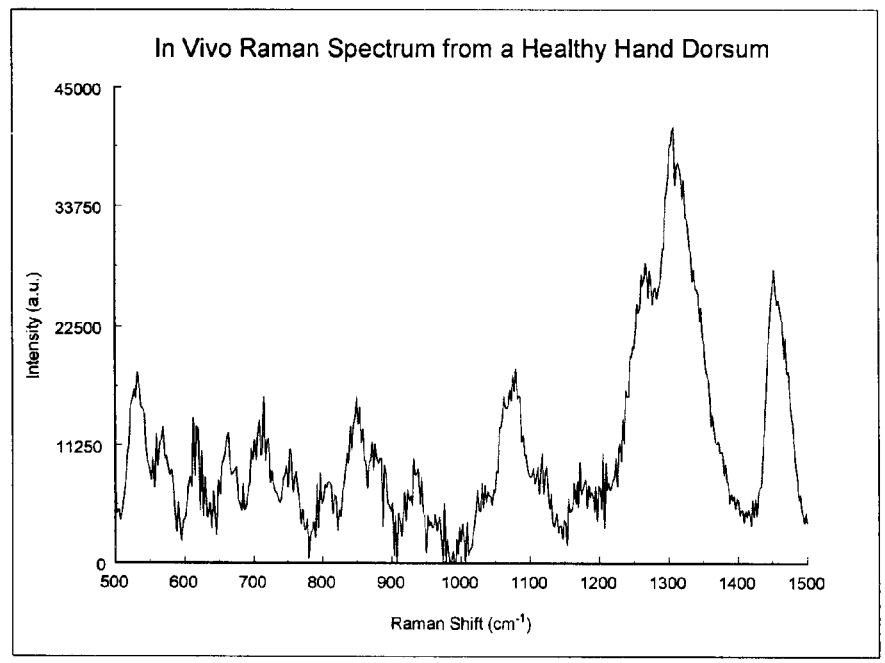
FIG. 8 provides an in vivo Raman spectrum from the back of the hand of a healthy volunteer with an integration time of 5 seconds using the Raman system of the present invention.

FIG. 8 shows an in vivo Raman spectrum from the hand dorsum of a healthy volunteer with an integration time of 5 seconds. The major Raman peaks shown in the graph are consistent with spectra published in literature.

Figure 9:
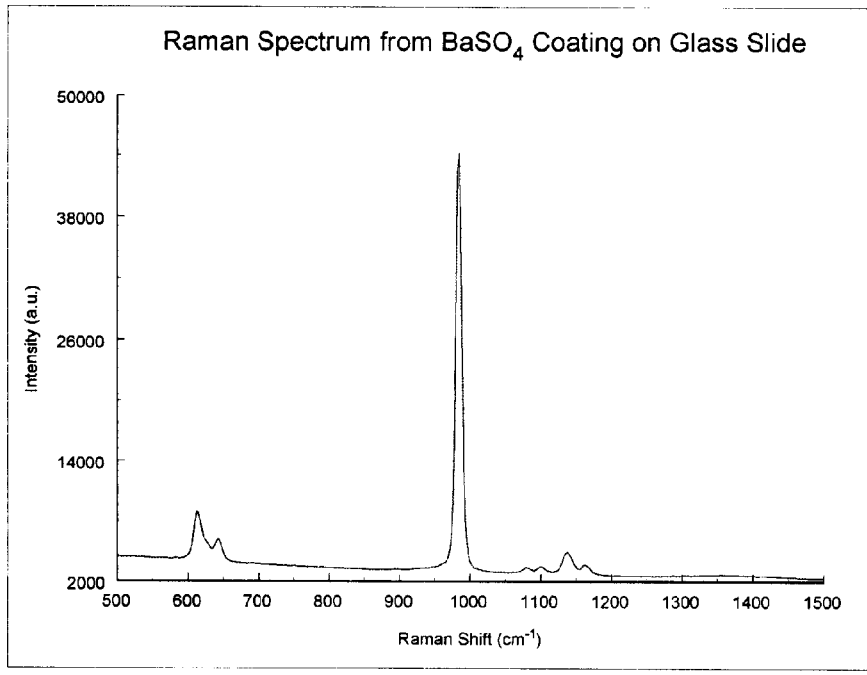
FIG. 9 provides a Raman spectrum of $BaSO_4$ coating on glass slide obtained with an integration time of 1 seconds using the Raman system of the present invention.

FIG. 9 shows a Raman spectrum of a $BaSO_4$ coating on a glass slide using an integration time of 1 second.

Figure 10:
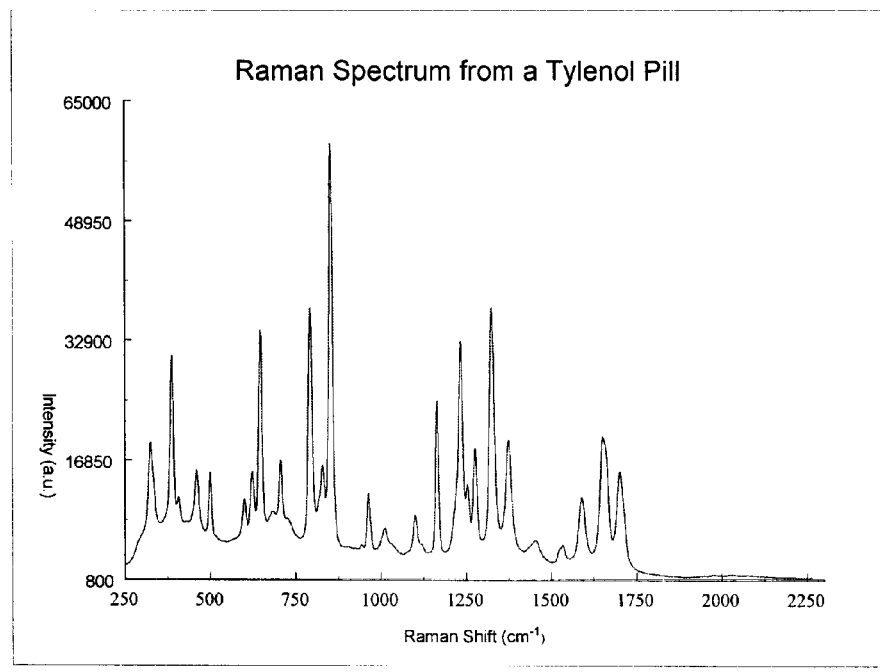
FIG. 10 provides a Raman spectrum obtained directly from an acetominophen (Tylenol®) pill obtained with an integration time of 0.5 seconds using the Raman system of the present invention.

FIG. 10 provides a Raman spectrum obtained directly from a Tylenol pill. No sample preparations were performed prior to obtaining the spectrum. The integration time was 0.5 seconds.

Figure 11:
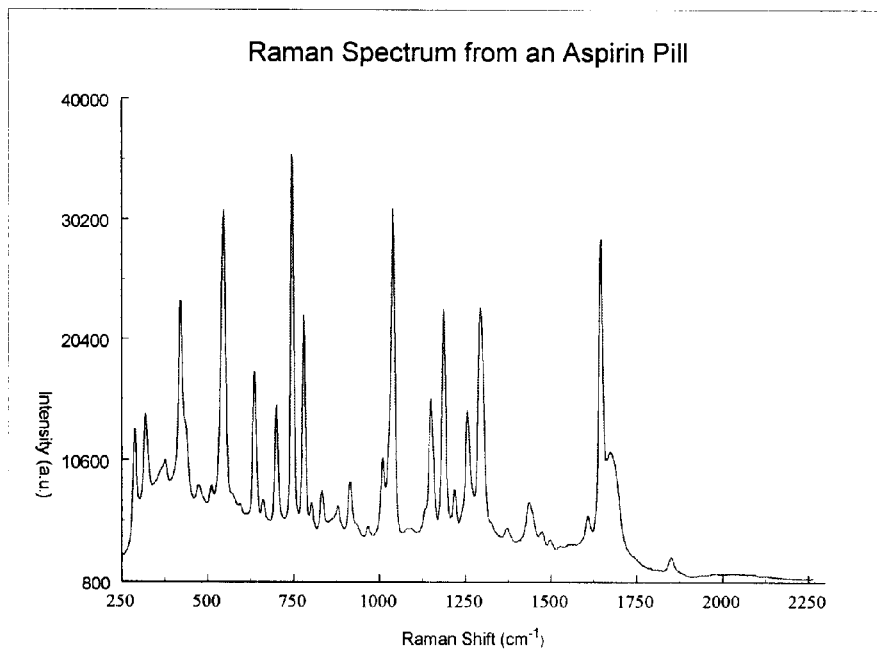
FIG. 11 provides a Raman spectrum obtained directly from an aspirin pill obtained with an integration time of 0.5 seconds using the Raman system of the present invention.

FIG. 11 provides a Raman spectrum obtained directly from an Aspirin pill. No sample preparations were performed prior to obtaining the spectrum. The integration time was 0.5 seconds.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A Raman spectrometer system comprising a detection light guide able to detect light emanating from a sample, a distal end of the detection light guide optically connected to a plane grating that is in turn optically connected to a pixelated light detector operably connected to a controller containing computer-implemented programming that detects light impinging on detection pixels in the pixelated light detector, wherein a light transmissive portion of the distal end of the detection light guide is arranged in a substantially inverse shape that is complementary to a distortion to the light caused by passing the light through the plane grating, to provide light in a substantially straight line at the pixelated light detector.

2. The Raman spectrometer system of claim 1 wherein the detection light guide comprises a light transmission bundle comprising at least 5 light guides, wherein the light guides are arranged in a filled-in geometrical shape at a proximal end of the light transmission bundle and a substantially linear curve at the distal end, and the plane grating comprises a holographic grating.

3. The Raman spectrometer system of claim 2 wherein the system further comprises a monochromatic illumination light source that provides illumination light to the sample.

4. The Raman spectrometer system of claim 3 wherein the system further comprises an illumination light guide and a probe located at the distal end of the illumination light guide, wherein the illumination light guide transmits the monochromatic illumination light from the light source to the probe, which in turn transmits the illumination light to the sample.

5. The Raman spectrometer system of claim 3 wherein the monochromatic illumination light source comprises an infrared laser.

6. The Raman spectrometer system of claim 4 wherein the illumination light guide comprises a single optical fiber having a diameter less than about 200 $\mu$m.

7. The Raman spectrometer system of claim 3 wherein the illumination light source provides light having a power of at least about 250 mW.

8. The Raman spectrometer system of claim 4 wherein the monochromatic illumination light source provides light having a wavelength of about 785 nm, and a power of about 300 mW.

9. The Raman spectrometer system of claim 4 wherein the proximal end of the detection light guide is optically connected to the probe.

10. The Raman spectrometer system of claim 9 wherein the proximal end of the detection light guide has a diameter greater than about 1 mm and the detection probe does not comprise a compound parabolic concentrator.

11. The Raman spectrometer system of claim 9 wherein the probe is sized to provide an illumination spot on the sample that is substantially larger than a detection spot detected by the probe.

12. The Raman spectrometer system of claim 1 or 2 wherein the substantially inverse shape is a parabolic curve.

13. The Raman spectrometer system of claim 1 or 2 wherein the plane grating is a volume phase technology (VPT) holographic grating.

14. The Raman spectrometer system of claim 1 or 2 wherein the light transmissive portion of the proximal end of the detection light guide comprises a filled-in geometrical shape.

15. The Raman spectrometer system of claim 14 wherein the filled-in geometrical shape is a circle.

16. The Raman spectrometer system of claim 1 wherein the detection light guide further comprises a calibration light guide optically connected to a calibration light source.

17. The Raman spectrometer system of claim 16 the calibration light guide is disposed at the center of the detection light guide.

18. The Raman spectrometer system of claim 1 wherein detector comprises an array of detection pixels and the detection light guide comprises a bundle comprising enough light guides to substantially fill a column or row of the array.

19. The Raman spectrometer system of claim 18 wherein bundle comprises more than about 50 light guides.

20. The Raman spectrometer system of claim 19 wherein the light guides are selected from the group consisting of an optical fiber, a liquid light guide and a hollow reflective light guide.

21. The Raman spectrometer system of claim 1 wherein the system is portable.

22. A Raman spectrometer system comprising a means for transmitting detection light emanating from a sample, a distal end of the means for transmitting detection light optically connected to a plane grating means that is in turn optically connected to a means for detecting that is operably connected to a controller means containing computer-implemented programming that detects light impinging on means for detecting, wherein the means for transmitting detection light provides light in a substantially inverse shape that is complementary to a distortion to the light caused by passing the light through the plane grating means, to provide light in a substantially straight line at the means for detecting.

23. The Raman spectrometer system of claim 22 wherein the system further comprises a means for providing monochromatic illumination light to the sample.

24. The Raman spectrometer system of claim 23 wherein the system further comprises a probe means for emitting illumination light to the sample and for receiving light emanating from the sample, the probe means optically connected to a distal end of a means for transmitting illumination light and to a proximal end of the means for transmitting detection light.

25. The Raman spectrometer system of claim 24 wherein the probe means provides an illumination spot on the sample that is substantially larger than a detection spot detected by the probe means.

26. The Raman spectrometer system of claim 22 wherein the system further comprises a means for transmitting calibration light.

27. The Raman spectrometer system of claim 22 wherein the system is portable.

28. A method of taking a Raman measurement comprising:
  a) illuminating a sample under conditions and for a time sufficient to induce measurable Raman scattered light to emanate from the sample;
  b) collecting the emanating light;
  c) providing the emanating light with a substantially inverse shape that is complementary to a distortion to the light caused by passing the light through a light-dispersive element;
  d) passing the light having the substantially inverse shape through a plane grating to provide substantially straight spectral lines; and,
  e) performing Raman spectroscopic analysis on the substantially straight spectral lines.

29. The method of claim 28 wherein the providing the substantially inverse shape further comprises transmitting the emanating light through a detection light guide wherein the light transmissive portion of the distal end of the detection light guide is arranged in a substantially inverse shape that is complementary to a distortion to the light caused by passing the light through the light dispersive element.

30. The method of claim 28 wherein the method further comprises illuminating the sample and collecting the emanating light through a probe optically connected to an illumination light source and to a detection light guide.

31. The method of claim 28 wherein the method further comprises providing an illumination spot on the sample that is substantially larger than the detection spot detected by a probe.

32. The method of claim 28 wherein the method further comprises providing calibration light.

33. The method of claim 28 wherein the method is performed using a portable Raman system.

34. The method of claim 28 wherein the Raman measurement is obtained in vivo.

35. The method of claim 28 or 34 wherein the Raman measurement is obtained in less than about 1 second.

* * * * *